April 27, 1965 D. BERLIN 3,180,679
BABY JUMPER
Filed Aug. 31, 1960 2 Sheets-Sheet 1
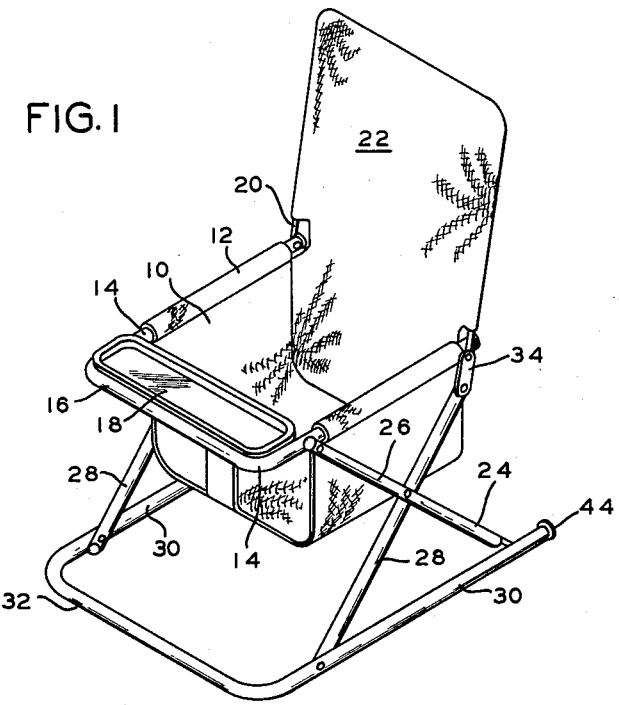
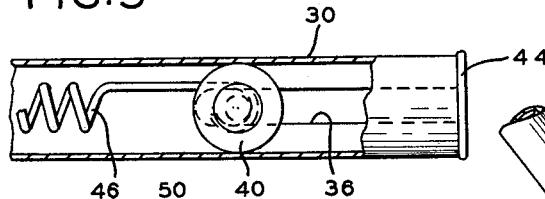
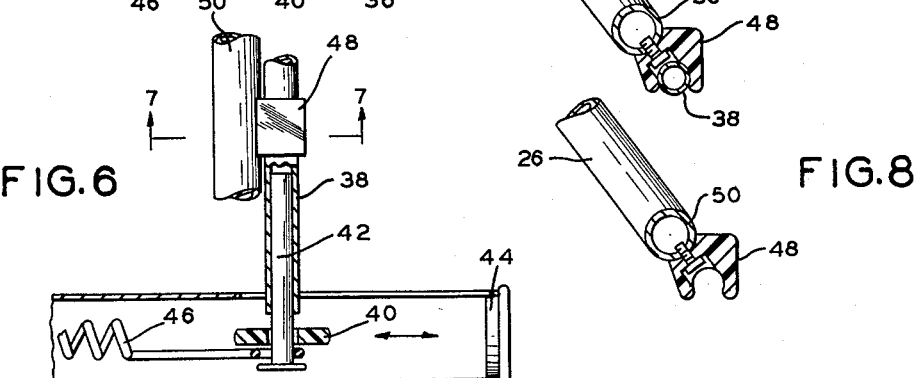
INVENTOR.
DANIEL BERLIN
BY
Caesar and Rivise
ATTORNEYS

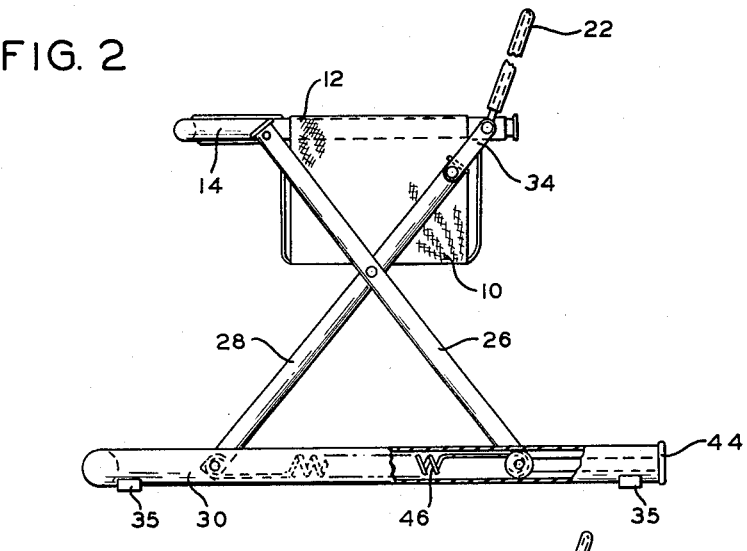
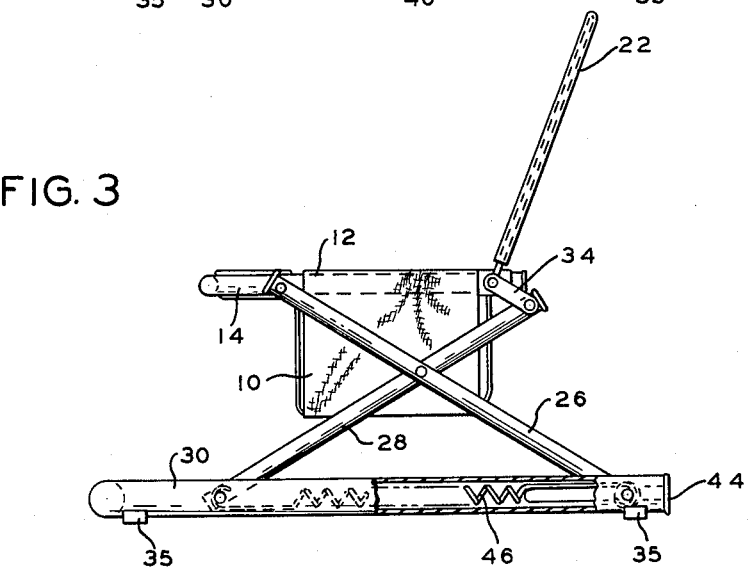
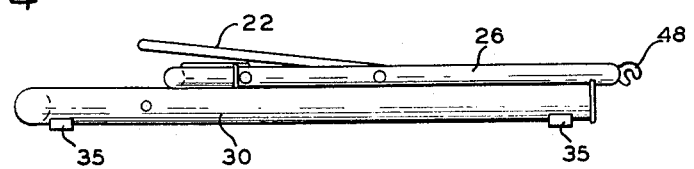

3,180,679
BABY JUMPER
Daniel Berlin, 4424 Paul St., Philadelphia, Pa.
Filed Aug. 31, 1960, Ser. No. 53,108
7 Claims. (Cl. 297—19)

This invention relates to an exercising seat for babies, also known as a "baby jumper" and particularly to such a baby jumper that is foldable.

A baby jumper is often constructed with a sling seat of canvas or the like and a frame that is spring mounted to provide a safe support for the seat and to permit and encourage jumping and exercising by a baby user. At the same time, the baby jumper should exhibit a high degree of stability to ensure the safety of the baby.

It is an object of this invention to provide a new and improved baby jumper.

It is another object of this invention to provide a new and improved baby jumper that is safe and reliable.

It is another object of this invention to provide a new and improved baby jumper that can be folded compactly.

It is another object of this invention to provide a new and improved foldable baby jumper that is safe and reasonable in cost of construction.

In accordance with this invention, a baby jumper includes a seat frame for a sling seat, a base for resting on the floor, and a spring mounted linkage for connecting the seat frame to the base. The linkage includes two pairs of pivoted links, means pivotally connecting the pairs of links to opposite sides of the seat frame and base, while permitting movement of the links along the seat frame and base, and spring biasing of the links with respect to the base.

A feature of this invention includes two springs in the sides of the base biasing a cross-arm, and means for detachably connecting a seat frame linkage thereto.

The foregoing and other objects of this invention, features of this invention as well as the invention itself may be more fully appreciated from the following description when read together with the accompanying drawing, in which:

FIG. 1 is a perspective view of a baby jumper embodying this invention;

FIG. 2 is a side elevation view with parts cut away of the baby jumper of FIG. 1;

FIG. 3 is a side elevation view similar to FIG. 2 but with the baby jumper in a different condition;

FIG. 4 is a side elevation of the baby jumper of FIG. 1 but placed in a folded condition;

FIG. 5 is an enlarged detailed view of a portion of the base of the baby jumper of FIG. 2;

FIG. 6 is an enlarged plan view of a portion of the base of the jumper of FIG. 1;

FIG. 7 is a sectional view along the line 7—7 of FIG. 6 illustrating a detachable clip connector; and FIG. 8 is a view similar to FIG. 7 with the clip detached.

In the drawing, corresponding parts are referenced by the same numerals.

A baby jumper includes a sling seat 10 of fabric or the like having tubular arm portions 12 that receive the legs 14 of a U-shaped tubular seat frame 16. A plastic tray 18 is attached to the cross-portion of the U-frame 16. Pivoted to the free ends of the legs 14 is a U-shaped wire frame 20 that frames the back 22 of the sling seat 10.

A U-shaped tube 24 has a leg 26 on each side of the seat frame 16 and pivotally attached by means of a pin at the free end thereof to the forward portion of the leg 14. The leg 26 is pivotally connected to a tubular bar link 28 at intermediate portions thereof. The bar link 28 is pivoted at its lower, forward end to the leg 30 of U-shaped tubular base 32, and at its upper end to a plate toggle link 34, which is, in turn, pivoted to the free end of the leg 14 of the seat frame. The links 26 and 28 are pivoted as separate pairs on each side of the seat frame 16 and base 32. Plastic gliders 35 are secured to the ends of the base legs 30.

The legs 30 of the base have slots 36 extending part way from the free ends thereof and along the inside surfaces. Slidable in the slots 36 is a tubular cross-bar 38, to the ends of which are attached roller guides 40 by means of headed pins 42 press fitted into the tube 38. The rollers 40 have a diameter approximately equal to the inside diameter of the tubes 30 in which the rollers ride. Caps 44 at the ends of the legs 30 close the legs and the slots 36. Extension springs 46 are positioned in the legs 30 between the headed pins 42 and the pivot pins for the bar links 28 to urge the cross-bar normally forward to the limit stop formed by the ends of the slots 36.

A detachable connection to the cross-bar 38 is provided by a plurality of plastic clips 48 that are attached to the connecting leg 50 of the links 26. The clip 48 is a plastic block with a circular groove therein and having lips that are spaced slightly less than the diameter of the cross-bar 38. The lips of the clip 48 resiliently pass the cross-bar in or out of the clip, but tend to retain the cross-bar within the groove thereof.

The folded condition of the jumper is illustrated in FIG. 4. To place the jumper in operating condition, the back 22 is pulled up to the position shown in FIG. 2 and the clips 48 are attached to the cross-bar 38. The springs 46 bias the cross-bar to the limit of its forward position, which moves the links 26 and 28 together, and the jumper assumes the condition shown in FIG. 2 with the seat 10 raised to its uppermost position.

In use, the seat is depressed somewhat by the weight of a baby, which tends to spread the links 26 and 28 apart (as illustrated in FIG. 3) against the bias of the springs 46. The caps 44 at the ends of the legs 30 form a limit stop for the roller guides 40. The jumping action of the baby up and down is followed by the seat 10 under the urging of the springs 46. The clips 48 open downwardly and are always urged downward by a component of the baby's weight to prevent accidental detachment from the cross-bar. The toggle link 34 permits the link 28 to move rearward under the jumping action past the end of the seat frame leg 14. This link 34 permits additional rearward movement of the link 28 when the jumper is folded down after detachment of the clips 48. The folding and unfolding of the jumper is quickly and easily accomplished due to ease of engagement of clips 48 and cross-bar 38.

The foregoing description is of a specific embodiment of this invention and is not to be construed as a limitation on the scope of this invention. Various modifications of the features of this invention are possible.

What is claimed as the invention is:

1. A baby jumper comprising a U-shaped tubular seat frame, a U-shaped tubular base having slotted legs, a cross-bar slidable in said slotted legs, a plurality of springs in said legs for biasing said cross-bar, two pairs of links pivoted to opposite sides of said seat frame and said base, means connecting each of said pairs of links to said seat frame for movement along said legs, and means for detachably connecting said pairs of links to said cross-bar.

2. A baby jumper as recited in claim 1 wherein said frame includes seat frame legs and said means connecting each of said pairs of links to said seat frame includes a separate link pivotally connected to a link of each of said pairs and to one of said seat frame legs.

3. A baby jumper as recited in claim 1 wherein said means for detachably connecting said pairs of links to said cross-bar includes a leg connecting a link of one of said pairs to a link of the other pair, and a clip connected to said connecting leg.

4. A baby jumper as recited in claim 3 wherein said clip includes a plastic block having a groove therein with an opening oriented to engage downwardly with said cross-bar, and having a plurality of resilient lips spaced a distance less than the thickness of said cross-bar.

5. A baby jumper comprising a seat frame including a sling seat having a back portion, a U-shaped tubular member adapted to be positioned horizontally for support of said seat as the arms thereof, and a U-shaped wire frame pivoted at its open ends to the open ends of said tubular member and adapted to be positioned somewhat vertically for support of said back portion; a base including a U-shaped tubular member having slots in the legs thereof and adapted for resting on a floor with the legs thereof parallel to and pointing in the same rearward direction as the legs of said tubular seat frame member; and a linkage for movably connecting said seat frame to said base, said linkage comprising two pairs of tubular links, each pair of said links being pivotally connected at intermediate points thereof, first links of each of said pairs being formed as the legs of a U-shaped member having two legs and a connecting cross-link, the free ends of said first links being pivotally connected to the legs of said seat frame member adjacent the forward ends thereof, lower ends of the second links of each of said pairs being pivotally connected to the legs of said U-shaped base member adjacent the forward ends thereof, a pair of third links pivoted to the upper ends of said second links and to the rearward ends of said seat frame member legs, a tubular cross-member for connection between the legs of said base member and slidably mounted in said slots, a pair of rollers on the ends of said cross-member and adapted to be positioned within said tubular base legs, a pair of springs in said tubular base legs and arranged for biasing said cross-member in the forward direction, and a plastic latching clip for removably connecting said cross-member to the cross-link connecting said first links whereby said seat frame may be folded down upon said base member.

6. A baby jumper comprising a seat frame, a base, and a linkage connecting said seat frame to said base and permitting raising and lowering of said frame, said base including two slotted tubular legs, a cross-bar slidable in said slotted legs, and springs in said tubular legs for biasing said cross-bar, said linkage including clip means for detachable connection to said cross-bar whereby the jumper may be folded and unfolded, said cross-bar including a plurality of roller guides secured to the ends of said cross-bar and movable within said tubular legs.

7. A baby jumper comprising a seat frame, a base, and linkage connecting said seat frame to said base and permitting raising and lowering of said frame, said linkage including a first pair of pivoted links and a second pair of pivoted links, means pivotally connecting the pairs of pivoted links to opposite sides of said seat frame, said base including two slotted tubular legs, a cross-bar slidable in said slotted legs, and springs in said tubular legs for biasing said cross-bar, said cross-bar including a plurality of roller guides secured to the ends of said cross-bar and movable within said tubular legs, said first pair of pivoted links being pivotally connected to said tubular legs, and said second pair of pivoted links being connected to said cross-bar, whereby said second pair of pivoted links may move longitudinally with respect to said tubular legs.

References Cited in the file of this patent

UNITED STATES PATENTS

| | | |
|---|---|---|
| 1,434,777 | Handler | Nov. 7, 1922 |
| 1,754,974 | Warfield | Apr. 15, 1930 |
| 2,089,090 | Di Giacomo | Aug. 3, 1937 |
| 2,567,341 | Martin | Sept. 11, 1951 |
| 2,710,647 | Dorton | June 14, 1955 |
| 2,758,634 | Welsh et al. | Aug. 14, 1956 |
| 2,927,628 | Gill | Mar. 8, 1960 |
| 2,997,339 | Wilson | Aug. 22, 1961 |
| 3,007,667 | Rossi | Nov. 7, 1961 |

FOREIGN PATENTS

| | | |
|---|---|---|
| 29,035 | France | Feb. 3, 1925 |
| 401,654 | France | Aug. 2, 1909 |
| 551,813 | Great Britain | Mar. 10, 1943 |

FRANK B. SHERRY, *Primary Examiner.*

GEORGE L. BREHM, *Examiner.*